US011792725B2

(12) United States Patent
Soliman et al.

(10) Patent No.: US 11,792,725 B2
(45) Date of Patent: Oct. 17, 2023

(54) NETWORK SLICE CUSTOMER (NSC) SERVICE ID AND USER EQUIPMENT (UE) ROUTE SELECTION POLICY FOR NETWORK SLICE AS A SERVICE

(71) Applicant: Apple Inc., Cupertino, CA (US)

(72) Inventors: Ahmed M. Soliman, Munich (DE); Christian W. Mucke, Munich (DE); Robert Zaus, Munich (DE); Sree Ram Kodali, San Jose, CA (US); Sudeep Manithara Vamanan, Nuremberg (DE)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 17/357,225

(22) Filed: Jun. 24, 2021

(65) Prior Publication Data

US 2022/0039004 A1    Feb. 3, 2022

Related U.S. Application Data

(60) Provisional application No. 63/059,768, filed on Jul. 31, 2020.

(51) Int. Cl.
*H04W 48/18*     (2009.01)
*H04W 88/18*     (2009.01)
*H04W 40/02*     (2009.01)
*H04W 8/18*      (2009.01)

(52) U.S. Cl.
CPC ............. *H04W 48/18* (2013.01); *H04W 8/18* (2013.01); *H04W 40/02* (2013.01); *H04W 88/18* (2013.01)

(58) Field of Classification Search
CPC ....... H04W 48/18; H04W 8/18; H04W 40/02; H04W 88/18; H04W 24/02; H04L 41/5009; H04L 41/5058; H04L 41/5051; H04L 47/78; H04L 41/0893
See application file for complete search history.

(56) References Cited

U.S. PATENT DOCUMENTS

| | | | |
|---|---|---|---|
| 2018/0316534 A1* | 11/2018 | Shin | H04L 5/0051 |
| 2021/0345159 A1* | 11/2021 | Prabhakar | H04W 76/16 |
| 2022/0038986 A1* | 2/2022 | Soliman | H04W 40/246 |
| 2022/0264440 A1* | 8/2022 | Iwai | H04L 45/85 |
| 2022/0279434 A1* | 9/2022 | Garcia Azorero | H04W 48/18 |

(Continued)

FOREIGN PATENT DOCUMENTS

EP    4175336 A2 *  5/2023 ............ H04W 48/14

*Primary Examiner* — Julio R Perez

(74) *Attorney, Agent, or Firm* — Eschweiler & Potashnik, LLC

(57) ABSTRACT

A network device or component such as an access node (AN) can operate to provide a request to obtain a network slice of a network slice as a service (NSaaS) to provide a communication service on the network slice for an end-user device. In response to obtaining the network slice, a network slice customer (NSC) Service identity (ID) associated with the network slice can be determined and provided for a communication service for an application by the end-user device or user equipment (UE). The request can be processed at a network slice provider (NSP) component, in which the network slice can be assigned to the NSC in response to the request by the NSC. The NSP further provides a user equipment (UE) route selection policy (URSP) comprising a traffic descriptor that includes the NSC Service ID to the NSC.

20 Claims, 10 Drawing Sheets

(56) References Cited

U.S. PATENT DOCUMENTS

2023/0119027 A1* 4/2023 Yang ................... H04W 76/38
370/329
2023/0138108 A1* 5/2023 Mysore Viswanath ......................
H04W 48/14
455/435.1

* cited by examiner

NETWORK SLICE CUSTOMER (NSC) SERVICE ID AND USER EQUIPMENT (UE) ROUTE SELECTION POLICY FOR NETWORK SLICE AS A SERVICE

CROSS-REFERENCE TO RELATED APPLICATIONS

The application claims the benefit of U.S. Provisional Patent Application 63/059,768 filed Jul. 31, 2020, entitled "NETWORK SLICE CUSTOMER (NSC) SERVICE ID AND USER EQUIPMENT (UE) ROUTE SELECTION POLICY FOR NETWORK SLICE AS A SERVICE", the contents of which are herein incorporated by reference in their entirety.

FIELD

The present disclosure is in the field of wireless communications, and more specifically, pertains to a network slice customer (NSC) service identifier (ID) and a user equipment (UE) route selection policy (URSP) for network slice as a service (NSaaS).

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions. A concern in network slicing as a service (NSaaS) is ensuring user privacy while also enabling policy management operations are seamless for data traffic in order to meet the demand for increase in traffic for larger bandwidth, lower latency, and higher data rates.

DETAILED DESCRIPTION

Figure 1:
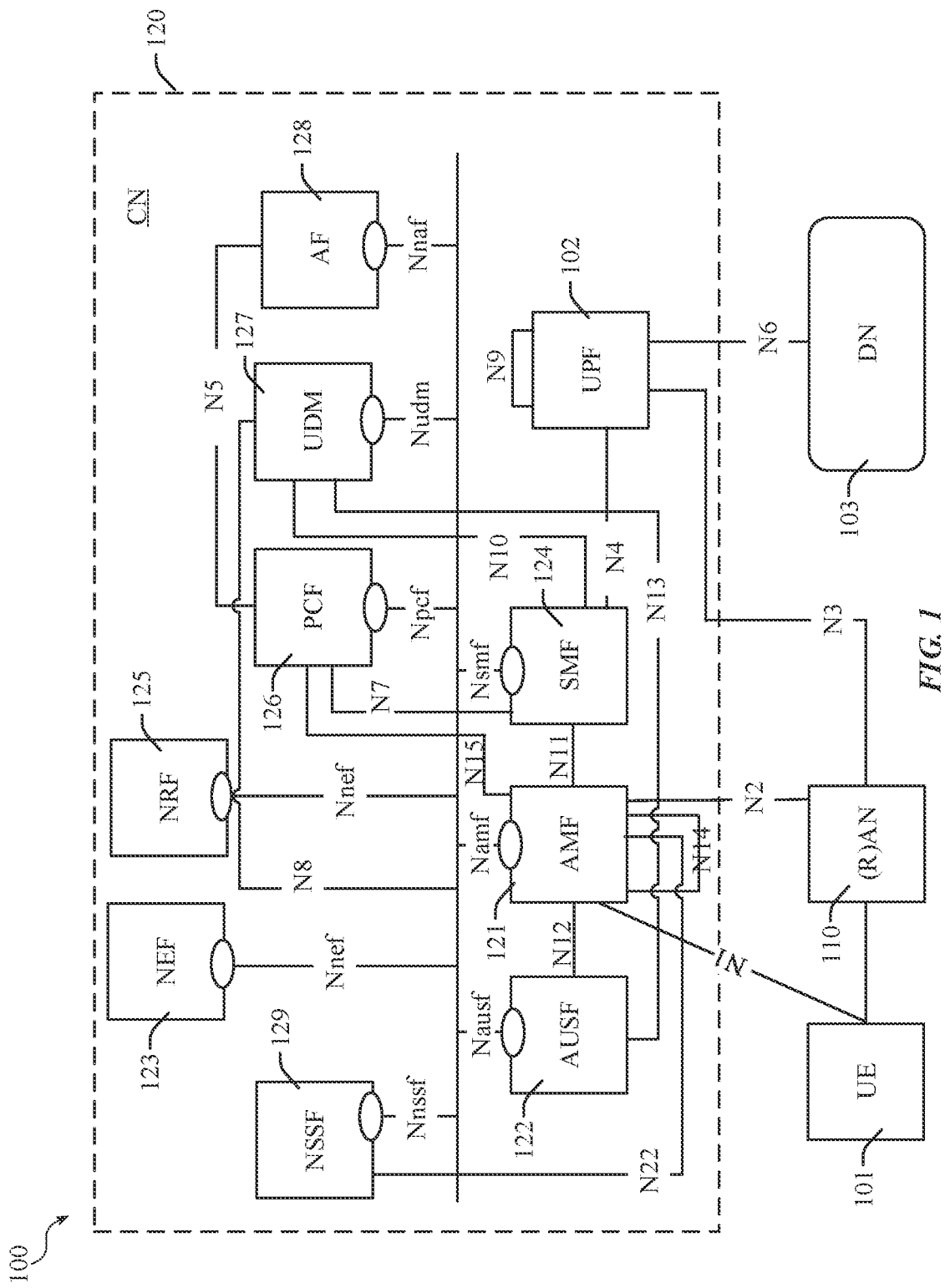
FIG. 1 is an exemplary block diagram illustrating an example of user equipment(s) (UEs) communicatively coupled a network with network components as peer devices useable in connection with various aspects described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like (or similarly ending) reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of various concerns for ensuring user privacy and data traffic management, a traffic descriptor can be configured to enable a network device (e.g., an end user device, user equipment (UE), base station, next generation NodeB (gNB), eNB, core network component, or other network component) to link a particular application service to a designated network slice (network slice instance) without impacting user privacy. In particular, a UE can receive a network slice customer (NSC) Service ID from an NSC such as a service provider of an application, wireless service, 3GPP provider, or the like. The NSC Service ID can identifier the NSC with a particular service once the NSC has obtained or received assignment to a network slice or network slice instance for control and management. The UE can further receive a UE route selection policy (URSP) with a traffic descriptor comprising the NSC Service ID or a component thereof and a rule that associates the NSC Service ID with a single network slice selection assistance information (S-NSSAI) for the network slice instance. The UE can then route data for an application with an application ID to the network slice assigned to the NSC for the particular service associated with the NSC Service ID of the NSC. Additional aspects and details of the disclosure are further described below with reference to figures.

FIG. 1 illustrates an architecture of a system 100 with various components including a core network (CN) 120 in accordance with various embodiments. The system 100 components can include a user equipment (UE) 101, which can be the same or similar to other UEs discussed herein; a radio access network (R)AN 110 or access node (AN); and a data network (DN) 103, which can be, for example, operator services, Internet access or 3rd party services, and a 5GC 120. The 5GC 120 can include an Authentication Server Function (AUSF) 122; an Access and Mobility Function (AMF) 121; a Session Management Function (SMF) 124; a Network Exposure Function (NEF) 123; a Policy Control Function (PCF) 126; a Network Function Repository Function (NRF) 125; a Unified Data Management (UDM) 127; an application function (AF) 128; a user plane function (UPF) 102; and a Network Slice Selection Function (NSSF) 129, each with or as respective components for processing corresponding 5GC network functions (NFs) or performance measurements related thereto as network functions associated with any one or more of the embodiments herein. Tunnelling or persistent transport connections associated with any embodiments can include a stream, connection such as a logical channel, logical connection, logical channel, or the like, which can be used for measurement task/activities/jobs associated with the NFs, or related measurements, KPIs, or service-based communications for the network. One or more components of the system 100 can be employed or utilized with, in or as a part of a user equipment (UE) (e.g., a mobile device, wireless device, or the like), a server provider network device/component (e.g., a network access node, network orchestrator, network server, rack server, network controller/processor, network data base, or the like), a computer premise equipment (CPE) (e.g., a router, residential/entity GW, access node, AP, base station, evolved/next generation NodeB (eNB/gNB), or the like).

The UPF 102 can act as an anchor point for intra-RAT and inter-RAT mobility, an external protocol data unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, uplink (UL)/downlink (DL) rate enforcement), perform Uplink Traffic verification (e.g., Service Data Flow (SDF) to Quality of Service (QoS) flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AMF 121 can be responsible for registration management (e.g., for registering UE 101, etc.), connection management, reachability management, mobility management, and lawful interception of AMF-related events, and access authentication and authorization. The AMF 121 can be a termination point for the N11 reference point between the AMF 121 and the SMF 124. The AMF 121 can provide transport for session management (SM) messages between the UE 101 and the SMF 124, and act as a transparent proxy for routing SM messages. AMF 121 can also provide transport for SMS messages between UE 101 and a Short Message Service (SMS) function (SMSF). AMF 121 can act as Security Anchor Function (SEAF), which can include interaction with the AUSF 122 and the UE 101, receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Security Context Management (SCM) function, which receives a key from the SEAF that it uses to derive access-network specific keys. Furthermore, AMF 121 can be a termination point of a RAN CP interface or RAN connection point interface, which can include or be an N2 reference point between the (R)AN 210 and the AMF 121; and the AMF 121 can be a termination point of Non Access Stratum (NAS) layer (N1) signalling, and perform NAS ciphering and integrity protection.

AMF 121 can also support NAS signalling with a UE 101 over an N3 Interworking Function (IWF) interface. The N3 IWF can be used to provide access to untrusted entities. N3IWF can be a termination point for the N2 interface between the (R)AN 210 and the AMF 121 for the control plane, and can be a termination point for the N3 reference point between the (R)AN 210 and the UPF 102 for the user plane. As such, the AMF 121 can handle N2 signalling from the SMF 124 and the AMF 121 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF can also relay uplink and downlink control-plane NAS signalling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit a Namf service-based interface, and can be a termination point for an N14 reference point between two AMFs 121 and an N17 reference point between the AMF 121 and a 5G-Equipment Identity Register (EIR) (not shown by FIG. 1).

The UE 101 can register with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the Access Network (AN) (e.g., Radio Resource Control (RRC) connection or UE-N3IWF connection for non-3GPP access) and the N2 connection for the UE 101 between the AN (e.g., RAN or memory 230) and the AMF 121.

The SMF 124 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 110 request, and released upon UE 101 and 5GC 110 request using NAS SM signaling exchanged over the N1 reference point between the UE 101 and the SMF 124. Upon request from an application server, the 5GC 110 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit a Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code, wherein a job or measurement instance includes a particular task or measurement activity to measure any particular parameter, metric, related to a KPI for any of the NFs. Additionally, the NRF 125 can exhibit the Nnrf service-based interface.

The UDM 127 can handle subscription-related information to support the network entities' handling of communication sessions and can store subscription data of UE 101. For example, subscription data can be communicated between the UDM 127 and the AMF 121 via an N8 reference point between the UDM 127 and the AMF. The UDM 127 can include two parts, an application FE and a Uniform Data Repository (UDR) (the FE and UDR are not shown by FIG. 2). The UDR can store subscription data and policy data for the UDM 127 and the PCF 126, and/or structured data for exposure and application data (including PFDs for application detection, application request information for multiple UEs 101) for the NEF 123.

The NSSF 129 can select a set of network slice instances serving the UE 101. The NSSF 129 can also determine allowed NSSAI and the mapping to the subscribed single Network Slice Selection Assistance Information (S-NS-SAIs). The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N12 reference point between AMF 121 and NSSF 129; and can communicate with another NSSF 129 in a visited network via an N31 reference point (not shown by FIG. 2). Additionally, the NSSF 129 can exhibit a Nnssf service-based interface.

Additionally, there can be many more reference points and/or service-based interfaces between the NF services in the NFs; however, these interfaces and reference points have been omitted from FIG. 1 for clarity. In one example, the CN 120 can include a Nx interface, which can be an inter-CN interface between the Mobility Management Entity (MME) and the AMF 121 in order to enable interworking between CN 120 and other CN. Other example interfaces/reference points can include an N5g-Equipment Identity Register (EIR) service-based interface exhibited by a 5G-EIR, an N27 reference point between the Network Repository Function (NRF) in the visited network and the NRF in the home network; and an N31 reference point between the NSSF in the visited network and the NSSF in the home network. Further, any of the above functions, entities, etc. can be considered or include a component as referred to herein.

Figure 2:
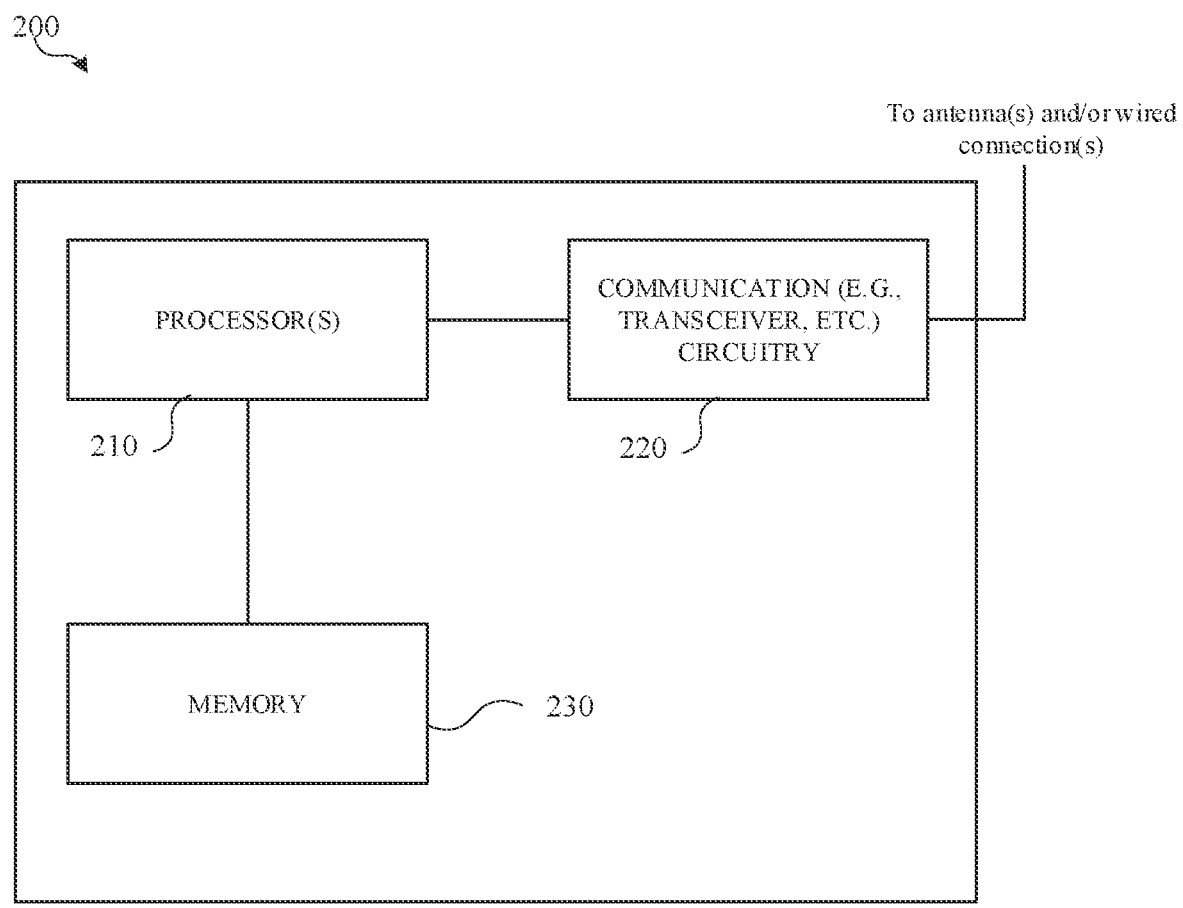
FIG. 2 is an exemplary a simplified block diagram of a user equipment (UE) wireless communication device or other network device/component (e.g., eNB, gNB) in accordance with various aspects.

Referring to FIG. 2, illustrated is a block diagram of a system 200 employable at a UE (e.g., UE 101), a next generation Node B (gNB, or AN 110) or other BS (base station)/TRP (Transmit/Receive Point), or a component of a 3GPP (Third Generation Partnership Project) network (e.g., a 5GC (Fifth Generation Core Network)) component such as a UPF (User Plane Function)) that facilitates generation and/or communication of performance measurements associated with one or more of a PDU (Protocol Data Unit) session and/or a N4 session, in embodiments. System 200 can include processor(s) 210 comprising processing circuitry and associated interface(s) (e.g., a communication interface for communicating with communication circuitry 220, a memory interface for communicating with memory 230, etc.), communication circuitry 220 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 230 (which can comprise any of a variety of storage mediums and can store instructions and/or data associated with one or more of processor(s) 210 or the communication circuitry 220 as transceiver circuitry). Specific types of embodiments (e.g., UE embodiments) can be indicated via subscripts (e.g., system 200 comprising processor(s) 210 (e.g., of a UE), communication circuitry 220, and memory 230). In BS embodiments (e.g., system 200 of a gNB) and network component (e.g., UPF (User Plane Function), etc.) embodiments (e.g., system 200 of a UPF) processor(s) 210 of the gNB (etc.), communication circuitry 220 (etc.), and memory 230 (etc.) can be in a single device or can be included in different devices, such as part of a distributed architecture. In embodiments, signaling or messaging between different embodiments of system 200 can be generated by processor(s) 210, transmitted by communication circuitry 220 over a suitable interface or reference point (e.g., N4, etc.), received by communication circuitry 220, and processed by processor(s) 210.

Figure 3:
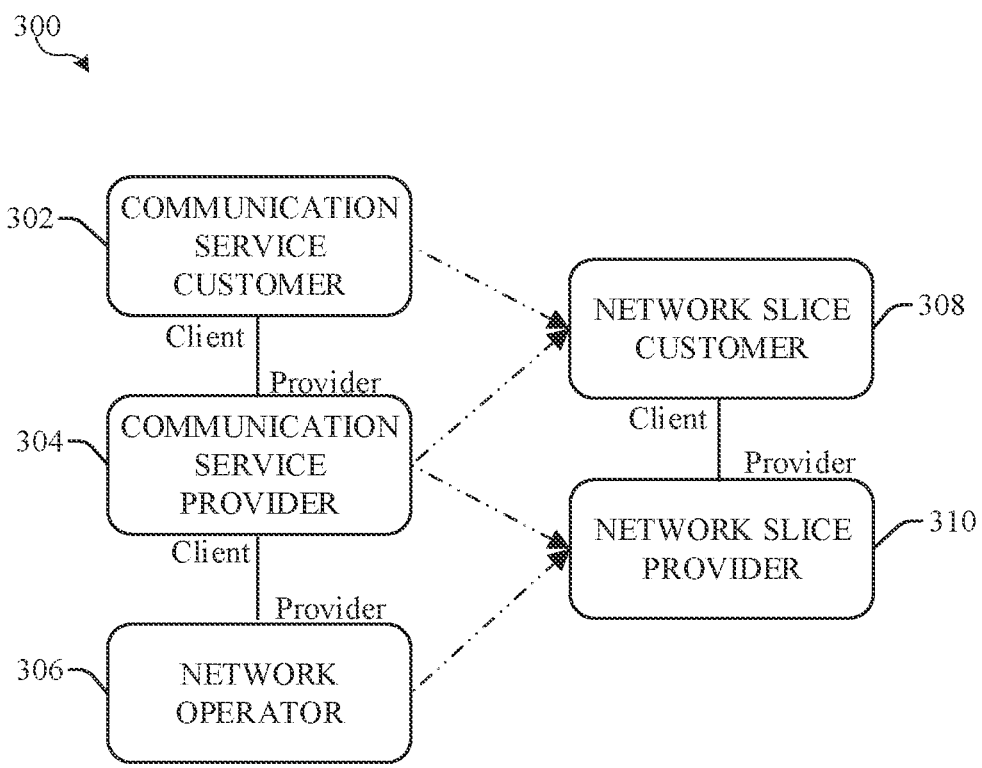
FIG. 3 is an exemplary a block diagram of network slicing as a service (NSaaS) components in accordance with various aspects.

Referring to FIG. 3, illustrates an example network slicing system 300 for a Network Slice as a Service (NSaaS) with various components. The network slice system 300, for example, can include a communication service customer (CSC) 302, a communication service provider (CSP) 304, a network operator (NOP) 306, a network slice customer (NSC) 308, a network slice provider (NSP) 310, or other component(s) not illustrated for facilitating network slicing or network slice instances as described herein to an end-user device or UE 101. Services such as communication services, networking services, application services or the like, can be referred to herein to include a data streaming service, an online gaming service, telecommunication services, or other services communicated via a network interface, either wired or wireless. These services, for example, can be a part of NSaaS.

The CSC 302 can be configured to utilize communication services as, for example, a UE device 101, an end-user device, a tenant or a vertical. The CSC 302 can be provided service or a network slice by the CSP 304 as a client or further provide networking service or use of the network slice to the NSC 308.

The CSP 304 can be configured to provide communication services and builds/establishes its own communication services, in which it can govern or control. The CSP 304 can provide the communication service with or without a network slice, which can be a separate network that operates on physical hardware for different applications, services, or purposes by separating the control plane from user plane function. Each network slice can have its own architecture provisional management and security that supports one or more specific use cases. Functions such as speed, capacity, connectivity, and coverage can be allocated via the network slice to meet any requirements of a particular objection or primary purpose, for example. The CSP 304 can be a provider of a service by providing a network slice or a service to the CSC 302, NSC 308, or NSP 310, for example, in which as a provider can control the management and use of the network slice or service to an customer component such as an end-user, UE or other component device. The CSP 304 can also be a client to receive such management or control of network slicing from the NOP 306, for example, or other component of a CN 120, or the like.

The NOP 306 can provide a network slice or service to the CSC 302, the CSP 304, or the NSP 310, for example, as a provider. The NOP 306 can be configured to design, build, and operate its networks to offer related services to one or more clients, either directly or indirectly via communication interfacing. The NOP 306 can operate as a component of or be communicatively coupled to the CN 120 or a central entity, for example.

The NSC 308 can operate to obtain use of a network slice as a NSaaS by another component/device so that services can be utilized such as an application relying upon the service for operation (e.g., gaming, data streaming, augmented reality, or the like). For example, the NSC 308 can be configured as a client, an end-user device or UE, for example, that uses the network slice according to an assigned service.

The NSP 310 can further provide services or a network slice obtained from another component to the NSC 308. The NSP 310 can operate as a provider by further designing, building, operating, controlling, or managing a network slice or service in response to obtaining or being assigned the network slice or service. The NSP 310 can also be or comprise the NOP 306 to provide network slicing as a NSaaS.

NSaaS or Network Slice as a Service as defined in section 4.1.6 in 3GPP TS 28.530, and referred to herein, can be offered by the CSP 304 to its CSC 302 in the form of a service (e.g., gaming, augmented reality, data streaming, or the like). This service allows the CSC 302 to use the network slice instance as the end user or optionally allows the CSC 302 to manage the network slice instance as manager via a management interface exposed by the CSP 304, for example. In turn, the CSC 302 can play the role of the CSP 304 and offer their own services (e.g. communication services) on top of the network slice instance obtained from the CSP 304. For example, a network slice customer or NSC 308 can also play the role of NOP 306 and could build their own network containing the network slice obtained from the CSP 304 as a "building block". In this model, both CSP 304 offering NSaaS and CSC 302 consuming NSaaS have the knowledge of the existence of network slice instances. Depending on the service offering, the CSP 304 offering NSaaS can impose limits on the NSaaS management capabilities exposure to the CSC 302, and the CSC 302 can manage the network slice instance according to NSaaS management capabilities exposed and agreed upon limited level of management by the CSP 304. Likewise, the NSP 310 can operate as a provider CSP 304 for the client NSC 308, or the CSC 302/NSC 308 can operate as a provider of the network slice to an end-user or UE device, for example.

Figure 4:
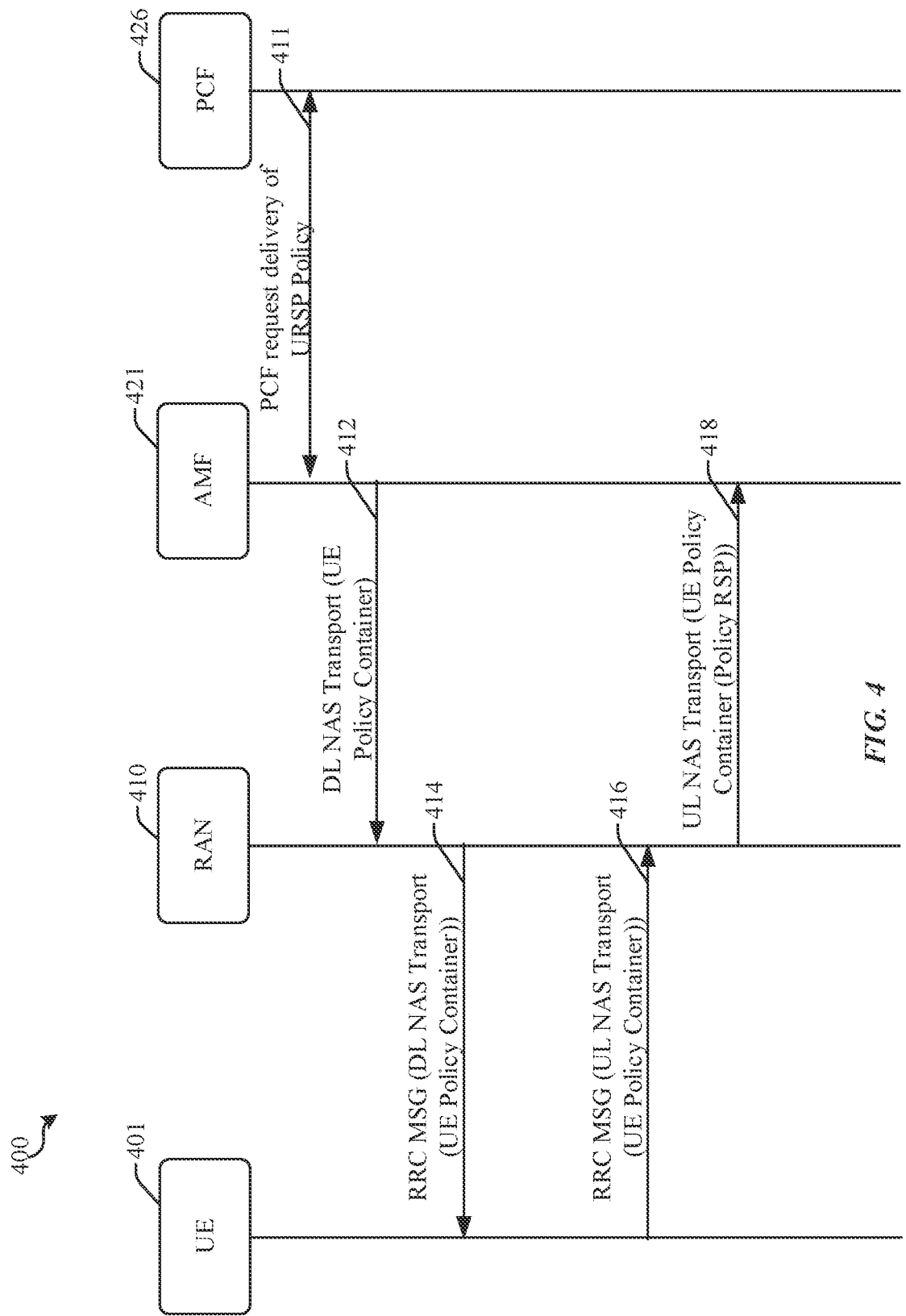
FIG. 4 is an exemplary data flow of network components for NSaaS in accordance with various aspects.

FIG. 4 is an example of diagram of a communication flow 400 for a UE Route Selection Policy (URSP) to enable network slicing. The process flow components comprise a UE 401 (e.g., UE 101), a RAN 410 (e.g., (R)AN 110), an AMF 421 (e.g., AMF 121), and PCF 426 (e.g., PCF 126). The AMF 421 and the PCF 426 can operate as an NSP for network slicing as an NOP, a central network entity, or core network for example, and the RAN can operate as an NSC providing services on the network slice to the UE 402 or end-user, for example.

A URSP can be used by the UE 401 to determine if a detected application (e.g., online gaming application, augmented reality application, data streaming application, or the like) can be associated to an established PDU Session, can be offloaded to non-3GPP access outside a PDU session, or can trigger the establishment of a new PDU Session. As such, the PDU session can operate as a logical connection between a UE 401 and a data network or network slice. A URSP can be pre-configured in the UE 402 or can be provisioned to UE 401 from the PCF 426 using a transparent container included in a NAS transport message, such as signals 411 thru 414. The signal message 411 comprises a PCF request delivery of a URSP policy, signal message 412 comprises a downlink (DL) NAS transport in a UE policy container from the AMF 421 to the RAN 410, and the signal message 414 is a radio resource control message with the message 412. In response to receiving the UE policy, the UE 401 can then provide the message 416 comprising an RRC message UL NAS transport UE policy container. The RAN 410 receives the message 416 and provides an uplink message 418 as a UL NAS Transport UE policy container policy RSP message.

A URSP rule includes one traffic descriptor that specifies the matching criteria and one or more of the route selection descriptors, which define the parameters of the PDU session to be used to transfer the traffic data. The traffic descriptor contains one or more of the following components: application identifiers, IP 3 tuples, non-IP descriptors, data network names (DNNs), connection capabilities and domain descriptors, i.e. destination fully qualified domain name(s) (FQDN(s)). According to embodiments or aspects herein, the traffic descriptor can include an NSC Service ID. A route selection descriptor can contain multiple elements (e.g., a PDU session type, a session and service continuity (SSC) mode, S-NSSAIs or DNNs.

The URSP can be evaluated by the UE 401 as is referenced in 3GPP TS 23.503, for example. For every newly detected application the UE 401 can evaluate the URSP rules in an order of rule precedence and determine if the application is matching the traffic descriptor of a URSP rule. When a URSP rule is determined to be applicable for a given application (see clause 6.6.2.1), the UE 401 can select a route selection descriptor within this URSP rule in the order of a route selection descriptor precedence. When a valid route selection descriptor is found, the UE 401 determines if there is an existing PDU Session that matches all components in the selected route selection descriptor. When a matching PDU Session exists, the UE 401 associates the application to the existing PDU Session by routing the traffic of the detected application on this PDU Session. If none of the existing PDU Sessions matches, the UE 101 can try to establish a new PDU Session using the values specified by the selected route selection descriptor.

The following is an example of URSP rule as clarified in Annex A in 3GPP TS 23.503:

| Example URSP rules | | Comments |
| --- | --- | --- |
| Rule Precedence = 3 Traffic Descriptor: DNN = DNN__1 | Route Selection Descriptor Precedence = 1 Network Slice Selection: S-NSSAI-a Access Type preference: Non-3GPP access | This URSP rule associates the traffic of applications that are configured to use DNN__1 with DNN__1, S-NSSAI-a over Non-3GPP access. It enforces the following routing policy: The traffic of application(s) that are configured to use DNN__1 should be transferred on a PDU session supporting S-NSSAI-a over Non-3GPP access. If this PDU session is not established, the UE shall attempt to establish the PDU session with S-NSSAI-a over Non-3GPP access. |

Various concerns can be addressed according to aspects/ embodiments herein. The application ID of an end user device or UE 101 (401) application is not shared with the network or the NSP, central operator or central core network entity in order to avoid impacting or preserving user privacy of the UE 101. A non-IP descriptor can be only used for applications transferred in a non-IP type PDU session. IP 3 tuples or the IP address of the application server is not necessarily unique and could be changed dynamically in a short time. A DNN is not mandatory that all application(s) in one DNN must use a same network slice. Consequently, a new or additional traffic descriptor element/component, referred to herein as an NSC Service ID can be configured to enable a network component to link an application to a correct slice without impacting user privacy of the UE or end user in particular.

Figure 5:
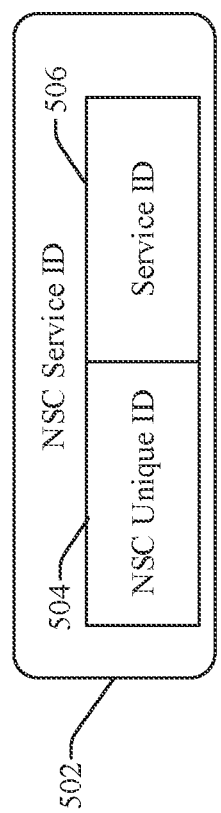
FIG. 5 is an exemplary network slice customer (NSC) service ID in accordance with various aspects.

FIG. 5 illustrates an example of an NSC Service ID 500 in accord with various aspects herein. The NSC Service ID 502 container can be configured to include an NSC Unique ID 504 and a Service ID 506. The NSC Unique ID 504 can be unique to the particular NSC and identifies the NSC offering a particular application service from among one or more communication services on a network slice or network slice instance (as a particular set of network resources or dedicated network resources). In Network Slice as a Service (NSaaS), a network component (e.g., Network Operator 306, core network 120 component (e.g., UPF 102, AMF 121, PCF 126, etc.), or an NSP 310 can provide a network slice based on a request from NSC 308 or (R)AN 110. The NSC 308 (e.g., (R)AN 110) can provide a communication service based on the provided network slice and enable end users or the UE 101 to use the provided network slice. Communication services can comprise any number of services on a network slice including, but not limited to, gaming operations, telecommunications, data streaming (e.g., video, chat, virtual reality, music, etc.), augmented reality (AR), or the like, which can be further associated to a particular application or application service at the UE by an application ID (app ID), for example.

The NSC Unique ID 504 can be obtained by the NSC, for example, from a global entity (e.g., 3GPP, a global system for mobile communications alliance (GSMA). This can be independent of a network slice provider (NSP 310), a network operator 306, or a core network 120 component. Alternatively, or additionally, the NSC 308 can obtain the NSC Service ID after negotiation with operator. At least a portion (e.g., the NSC Unique ID 504, the NSC Service ID 506, or the NSC Service ID 502 container) of the NSC Service ID 500 can be unique per operator or manager of the network slice. In this case, when the UE 101 or user device switches or changes the universal mobile telecommunication system (UMTS) subscriber identity module (USIM), a repeat of the registration/binding of the application to the specific NSC Service ID 502 of the NSC 308 can be performed. In one example, the NSC Unique ID 504 can be at least 16 bits.

The Service ID 506 can be assigned to a particular communication service or application service for an application to use the network slice. For example, the Service ID can designate that only online gaming operations/services. Other services or application operations can also be assigned to the Service ID and not are not necessarily limited to the example of online gaming. In an aspect, a single application service (e.g., online gaming, or other service) can be designated or assigned to the Service ID 506 so that one or a multiple of UEs/user devices can utilize the network slice according to the particular application ID of an application (e.g., game or other data application) for use of the particular service with the network slice obtained by the NSC 308. The Service ID can be assigned, negotiated or designated by the NSC 308 with the NSP 310 (as a network operator, or CN component) for association with the network slice, which can be reserved as dedicated resources (e.g., storage amount, bandwidth, processing power, attribute names and their definitions for a supported throughput in uplink or downlink, a delay, a coverage area of the slice, etc.) as isolated from other network slices, for example.

The UE 101, for example, can further receive the NSC Service ID 502 from the NSC and a URSP from a network operator as an NSP with the NSC Service ID as a traffic descriptor. The traffic descriptor can further comprise a rule for associating the NSC Service ID with an S-NSSAI to enable use of the correct network slice for the particular communication service for an application at the UE 101. The UE 101 thus does not have to share the App ID of the application with the NSP.

Figure 6:
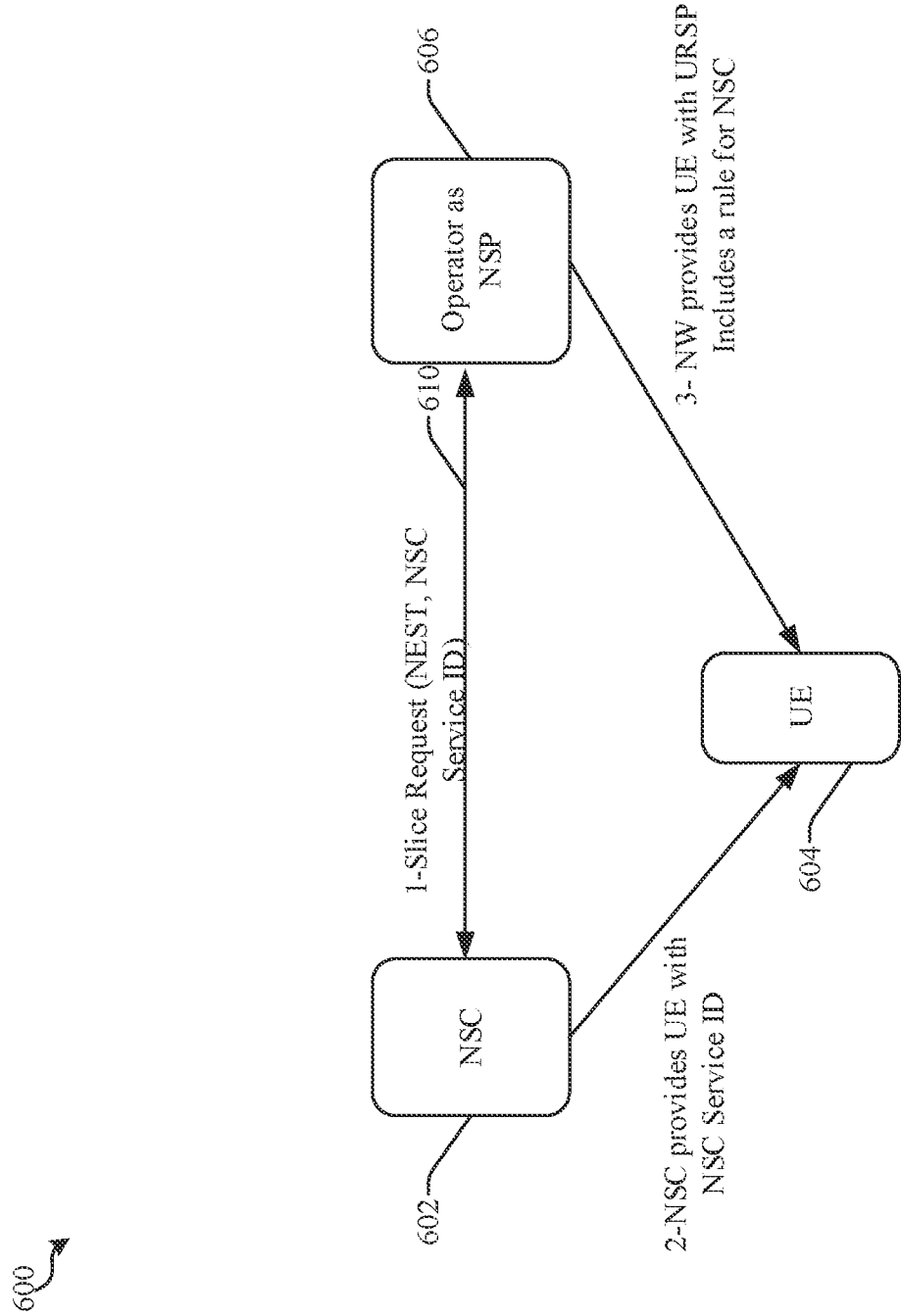
FIG. 6 is an exemplary system diagram of network slicing as a service (NSaaS) components in accordance with various aspects.

FIG. 6 illustrates an example network system 600 for a network slice of NSaaS in accord with various aspects being described herein. The system 600 includes an NSC 602, a UE 604 and an NSP 606. The UE 604 can be configured as UE 101, 200, 401 or any end user device as described herein. The NSC 602 can be configured as the NSC 308, and the NSP 606 can be configured as the NSP 310 as a network operator 306, or another core network 120 component.

The NSP 606 can be configured to generate a URSP comprising a rule that links the NSC Service ID 500 (502) with an S-NSSAI of a network slice. This can be done in response to a communication from the NSC 602 requesting the network slice, or an assignment of an NSC Unique ID 502 or the NSC Service ID 502 to the NSC 602 for the network slice. This can be done without any communication by the UE 604 with the NSP 606, for example. In response to a request by the NSC 602 to the NSP 606 for a network slice, the NSP 606 can provide a network slice type (NEST) with the NSC Service ID 502 comprising the NSC Unique ID 504 and the Service ID 506. The NEST can define characteristics of the network sliced assigned to the NSC 602. Such characteristics can include attribute names, and their definitions for a supported throughput in uplink or downlink, a delay, a coverage area of the slice, or other dedicated resources, for example.

The NSP 606 can be configured to modify the URSP to comprise the NSC Server ID 502 or at least a portion thereof (e.g., NSC Unique ID 502, Service ID 504) as a valid traffic descriptor. The NSP 606 as an operator can be configured to add a rule in the URSP to link the NSC Service ID 502 to the S-NSSAI for linking traffic to the network slice assigned to the NSC 602. The following is an example of the URSP rule generated by the NSP 606 as an operator and provided to the UE 604 for association of the NSC Service ID to a network slice obtained by the NSC 602:

| Example URSP rules | | Comments |
|---|---|---|
| Rule Precedence = 1 | Route Selection Descriptor | This URSP rule associates the traffic of application related to NSC |

-continued

| Example URSP rules | | Comments |
| --- | --- | --- |
| Traffic Descriptor: NSC Identifiers = NSC Service ID 1 | Precedence = 1 Network Slice Selection: S-NSSAI-a SSC Mode Selection: SSC Mode 3 DNN Selection: internet Access Type preference: 3GPP access | Service ID 1 with S-NSSAI-a, SSC Mode 3, 3GPP access and the "internet" DNN. It enforces the following routing policy: The traffic of application related to NSC Service ID 1 should be transferred on a PDU session supporting S-NSSAI-a, SSC Mode 3 and DNN = internet over 3GPP access. If this PDU session is not established, the UE shall attempt to establish a PDU session with S-NSSAI-a, SSC Mode 3 and the "internet" DNN over 3GPP access. |

As state above, the URSP includes a traffic descriptor comprising the NSC Service ID and a rule that associates the NSC Service ID with an S-NSSAI that enables the UE 604 to route traffic to the network slice assigned to the NSC 602 in NSaaS based on the NSC Service ID and the S-NSSAI. The URSP rule in the URSP is provided to the UE 604 by the NSP 606, while the NSC Service ID is provided to the UE 604 by the NSC 602. The URSP rule is configured to associate traffic of the application to the NSC Service ID with the S-NSSAI, and can further comprise at least one of: a session and service continuity (SSC) mode, a preferred access type, or a data network name (DNN). In the present example, the DNN can indicate "internet".

The UE 604 can determine whether the NSC Service ID from the NSC 602 is associated with an online gaming service based on a service ID of the NSC Service ID. The UE can further determine whether an application ID associated with an application or application service (e.g., an online gaming service, or other service) matches the URSP rule of the URSP in response to an initiation of the application or application service. Then the UE 604 can further determine whether an existing packet data unit session or PDU session matches a route selection descriptor of a traffic descriptor that comprises the NSC Service ID and the S-NSSAI, linking the two for a particular network slice identified by the NSC 602. In response to a determination that the NSC Service ID is associated with the service, a match of the application ID with the URSP rule of the URSP, and the existing PDU session matching the route selection descriptor, the UE can associate the application service (e.g., an online gaming service, data streaming, or other application service) to the existing PDU session on the network slice that is associated with the S-NSSAI.

Figure 7:
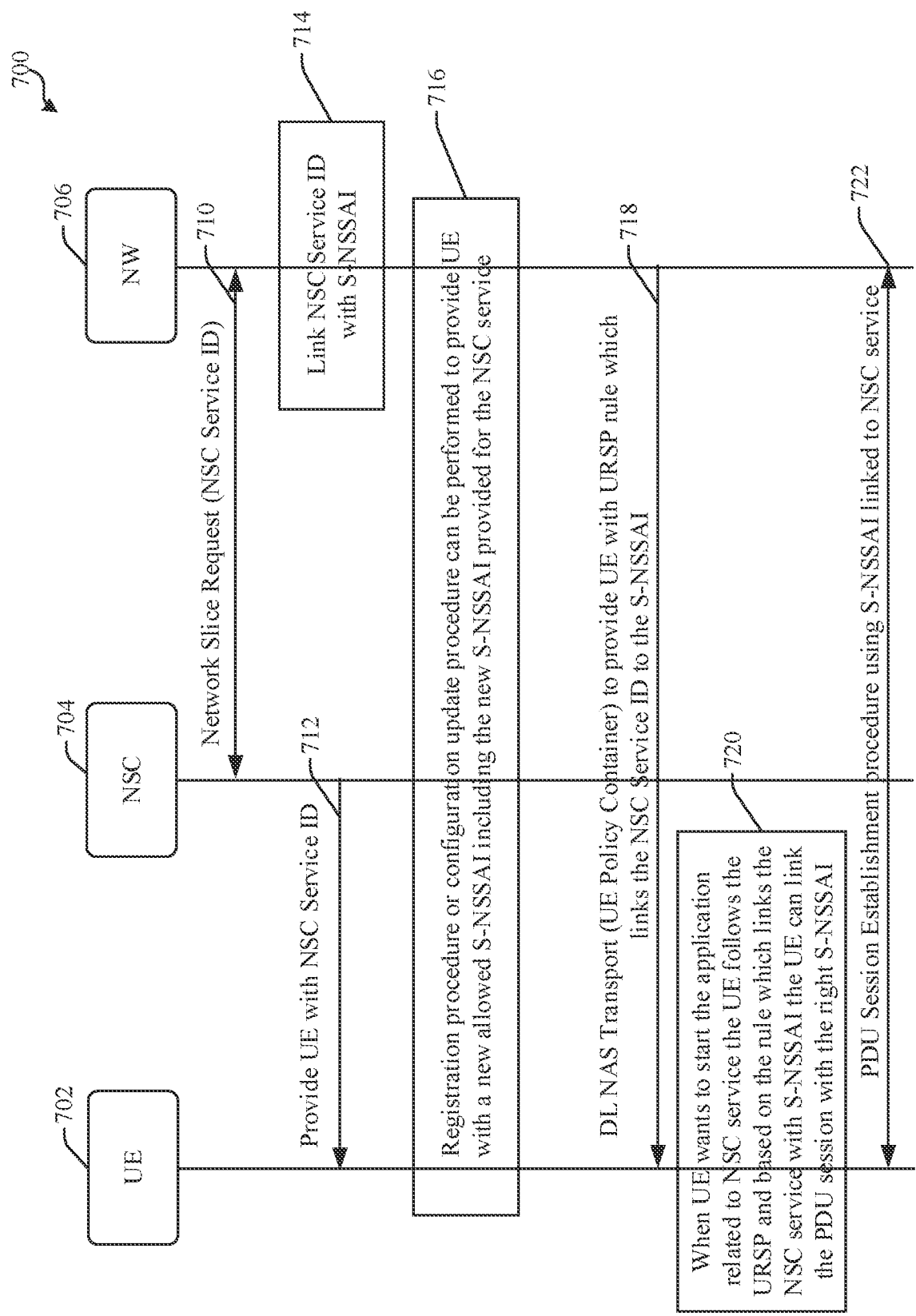
FIG. 7 is another exemplary data flow of network components for NSaaS with an NSC Service ID in accordance with various aspects.

FIG. 7 illustrates an example data flow 700 in accord with various aspects herein. An NSC 704, for example, can communicate a request for a network slice instance and obtain an NSC Service ID 500 for the network slice from a network component 706, an operator, an NSP or another provider component. The UE 702 is provided with the NSC service ID 712 from the NSC 704, and the NW 706 links the NSC Service ID to the S-NSSAI for connecting the network slice at 714. At 716, a registration procedure can be processed or a configuration update procedure can be preformed to provide the UE 702 newly active S-NSSAI as configured at 714, which includes the S-NSSAI for the NSC service or communication/application service to be provided on the network slice. The NW 716 provides the UE 702 in a downlink NAS transport message a UE policy container to provide the UE with a URSP rule that links the NSC service ID to the S-NSSAI. At 720, when the UE 702 desires to initiate the application related to the NSC service, the UE 702 follows the URSP; based on the rule that links the NSC service with the S-NSSAI, the UE 702 can link a PDU session with the correct S-NSSAI for the correct network slice. At 722, a PDU session establishment procedure can be performed using the S-NSSAI linked to the NSC service.

Figure 8:
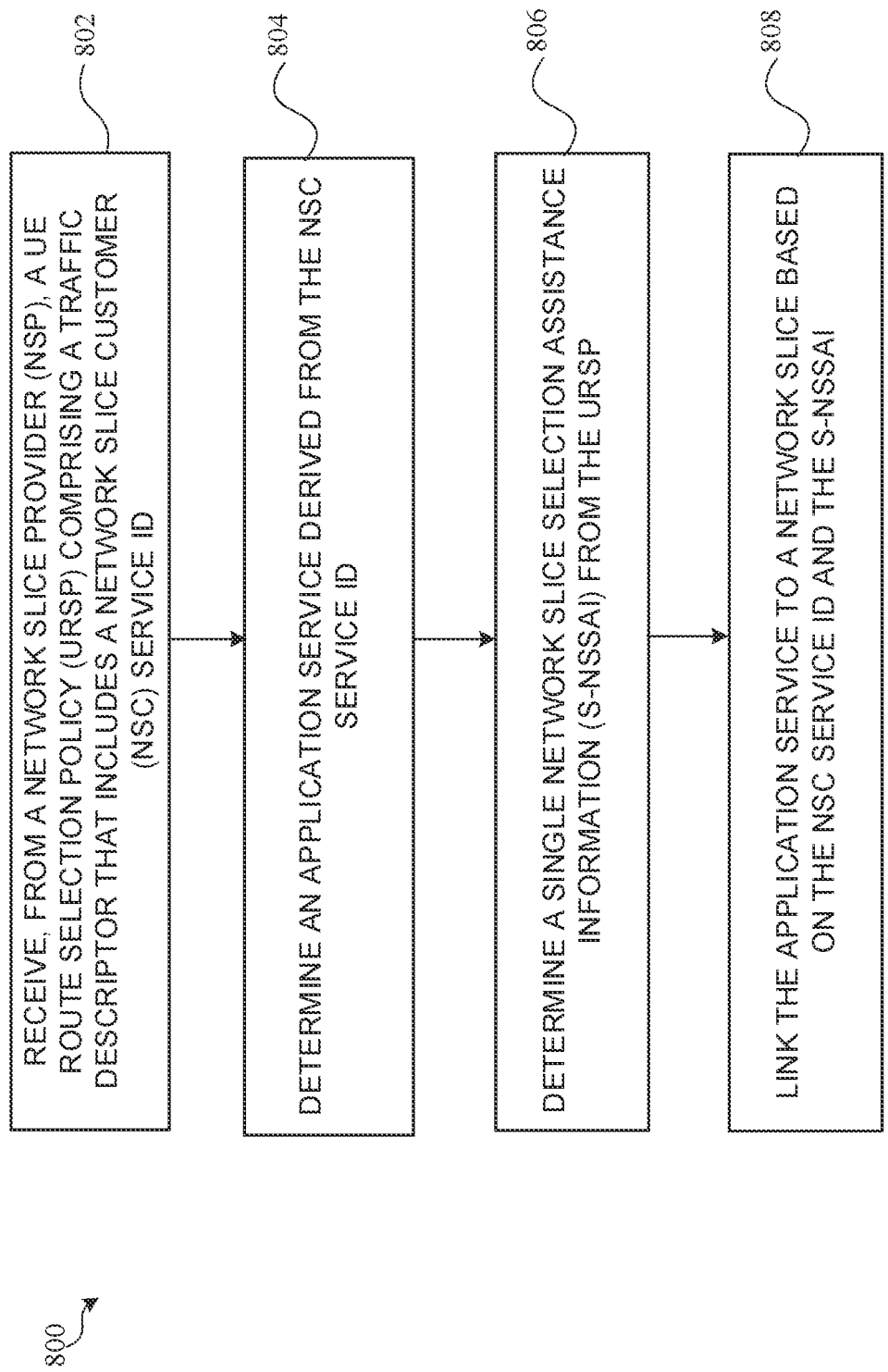
FIG. 8 is another block diagram illustrating an example process flow for network slicing according to various aspects.

Referring to FIG. 8, illustrated is an example process flow 800 for a network device or component (e.g., UE 101, base station 110, AN 110 or other network component) to enable network slicing based on an NSC Service ID of an NSC and a URSP of an NSP, network operator or CN component.

The process flow initiates at 802 with receiving, from an NSP, a UE route selection policy (URSP) comprising a traffic descriptor that includes an NSC Service ID. At 804, the process flow 800 further comprises determining an application service derived from the NSC Service ID. At 806, the process flow 800 further comprises determining a single network slice selection assistance information (S-NSSAI) from the URSP. At 808, the process flow 800 comprises linking the application service to a network slice based on the NSC Service ID and the S-NSSAI.

The process flow 800 can further comprise receiving the NSC Service ID from a network slice customer (NSC) that identifies the application service and the NSC providing the application service to the UE with the network slice. In response to detecting initiation of an application of the application service, the process flow can include routing traffic to the network slice based on the NSC Service ID associated with the S-NSSAI without sharing an application identifier of the application with the NSP. An NSC unique ID can be determined from the NSC Service ID, and the application service assigned to the network slice can be determined from a service ID of the NSC Service ID, in which the NSC Service ID enables an association of the NSC with the application service for the network slice.

The process flow 800 can further comprise determining whether the NSC Service ID is associated with an online gaming service based on a service ID of the NSC Service ID; determining whether an application ID associated with the online gaming service matches a URSP rule of the URSP in response to an initiation of the online gaming service; determining whether an existing packet data unit (PDU) session matches a route selection descriptor of a traffic descriptor that comprises the NSC Service ID and the S-NSSAI; and in response to a determination that the NSC Service ID is associated with the online gaming service, a match of the application ID with the URSP rule of the URSP, and the existing PDU session matching the route selection descriptor, associating the online gaming service to the existing PDU session on the network slice that is associated with the S-NSSAI.

Figure 9:
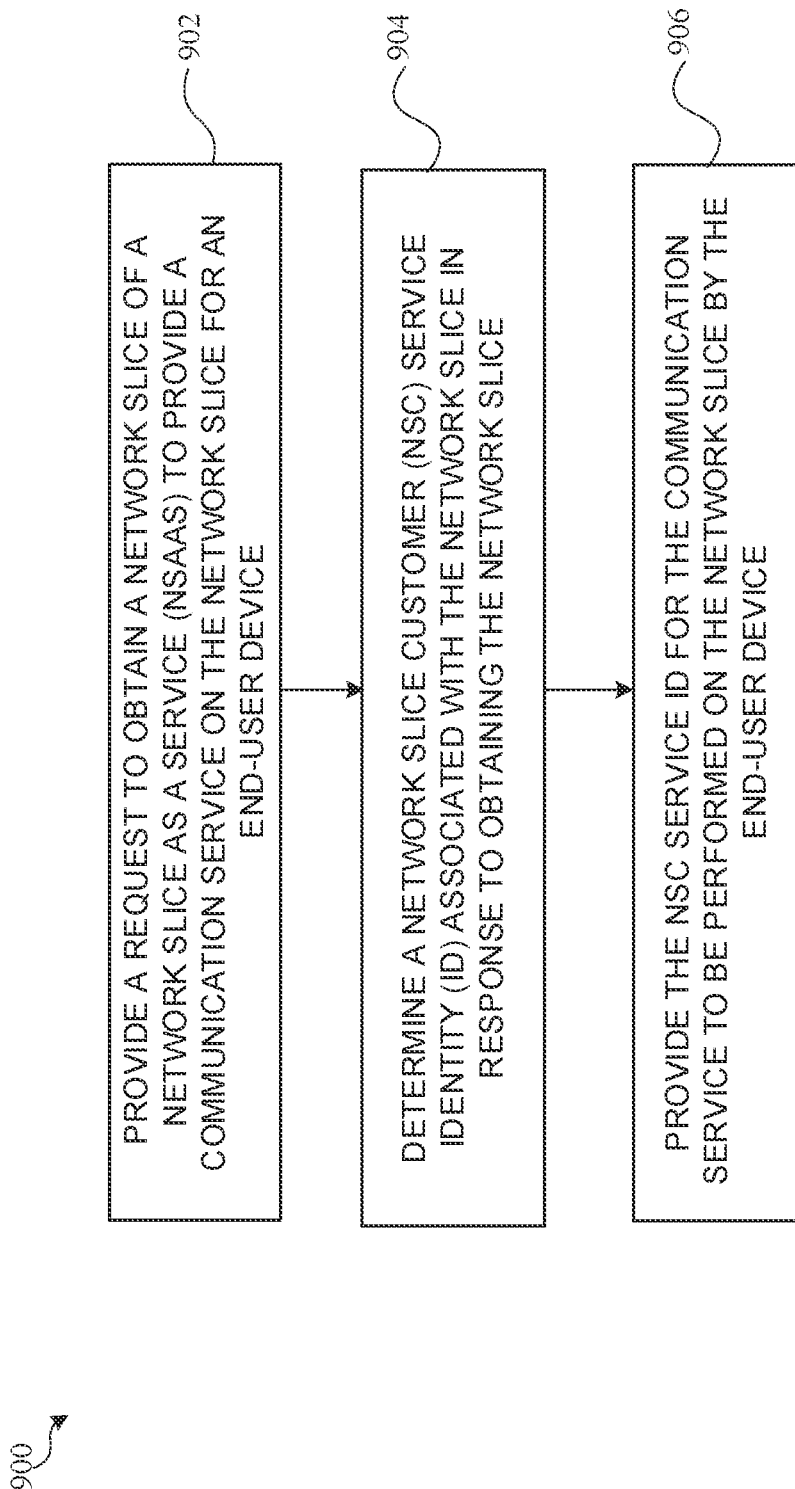
FIG. 9 is another block diagram illustrating an example process flow for network slicing according to various aspects.

Referring to FIG. 9, illustrated is an example process flow 900 for a network device or component (e.g., UE 101, base station 110, AN 110, NSC 308, 602 or other network component) to enable network slicing based on an NSC Service ID of an NSC and a URSP of an NSP, network operator or CN component as NW 706.

The process flow 900 initiates at 902 with providing a request to obtain a network slice of a network slice as a service (NSaaS) to provide a communication service on the network slice for an end-user device. At 904, the process flow 900 includes determine a network slice customer (NSC) Service identity (ID) associated with the network slice in response to obtaining the network slice. At 906, the process flow 900 includes providing the NSC Service ID for the communication service to be performed on the network slice by the end-user device.

The process flow 900 can further include receiving the NSC Service ID from a network slice provider (NSP), a network operator or a core network component to assign the access node as a network slice customer (NSC) for the network slice. The Network Service ID comprises a unique ID (NSC Unique ID) that is independent of a network operator or other NSCs. The NSC unique ID can be obtained within the NSC Service ID from a global entity that comprises at least one of: a global system for mobile communications alliance (GSMA) or 3GPP independent of a network slice provider (NSP), a network operator or a core network component. The NSC Service ID can enable a UE or end-user device to utilize the obtained network slice and for a single application service as the communication service to be associated to the NSC Service ID based on a URSP that includes the NSC Service ID in a traffic descriptor.

Figure 10:
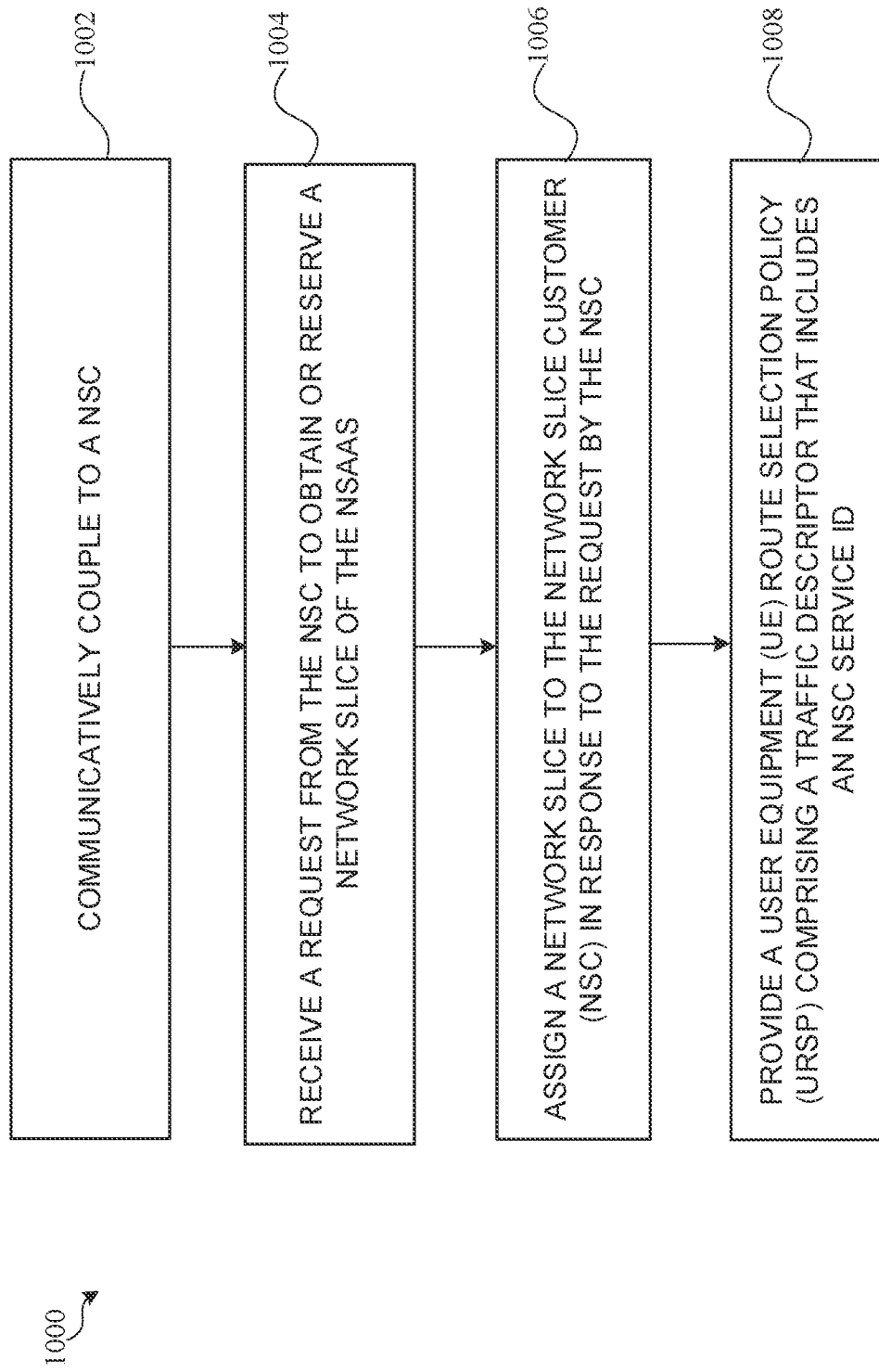
FIG. 10 is another block diagram illustrating an example process flow for network slicing according to various aspects.

Referring to FIG. 10, illustrated is an example process flow 1000 for a network device or component (e.g., UE 101, base station 110, AN 110, NSC 308, 602 or other network component such as NSP 310, 606) to enable network slicing based on an NSC Service ID of an NSC and a URSP of an NSP, network operator or CN component as NW 706.

The process flow 1000 initiates at 1002 with communicatively coupling to a network slice customer (NSC). At 1004, the process flow 1000 includes receiving a request from the NSC to obtain or reserve a network slice of the NSaaS. At 1006, the process flow 1000 includes assigning a network slice to the NSC in response to the request by the NSC. At 1008, the process flow 1000 includes providing a user equipment (UE) route selection policy (URSP) comprising a traffic descriptor that includes an NSC Service ID.

The process flow 1000 can further include generating a URSP rule of the URSP that associates traffic of an application to the NSC Service ID with an S-NSSAI, and further comprises at least one of: a session and service continuity (SSC) mode, a preferred access type, or a data network name (DNN). The NSC Service ID comprises an NSC unique ID associated with the NSC and a service ID associated with a communication service to be provided by the NSC on the network slice. A downlink (DL) non-access stratum (NAS) transport UE policy container message can be provided with a rule of the URSP that links the NSC Service ID to the S-NSSAI to enable an association of a packet data unit (PDU) session with the S-NSSAI for an application of a communication service on the network slice. The NSC Unique ID can be provided to the NSC to distinguish the NSC among other NSCs providing a communication service and provide a Service ID for the NSC to associate the communication service on the network slice.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a user equipment (UE) for a new radio (NR) network comprising: one or more processors configured to: receive, from a network slice customer (NSC), an NSC Service ID that associates the NSC with a communication service; receive, from a network slice provider (NSP), a UE route selection policy (URSP) comprising a traffic descriptor comprising the NSC Service ID and a rule that associates the NSC Service ID with a single network slice selection assistance information (S-NSSAI); and in response to detecting an execution of an application of the communication service, route data traffic to a network slice instance of a network slice as a service (NSaaS) based on the NSC Service ID from the NSC and the S-NSSAI associated with the NSC Service ID according to the URSP from the NSP.

A second example can include the first example, wherein the one or more processors are further configured to: associate the NSC Service ID to a single application of the communication service based on a service ID of the NSC Service ID.

A third example can include the first or second example, wherein the rule of the URSP indicates that the NSC Service ID is associated with the network slice instance of the NSaaS based on the S-NSSAI.

A fourth example can include any one or more of the first through third examples, wherein the one or more processors are further configured to: establish a routing session for a gaming service as the communication service based on an application ID of the gaming service associated with the NSC Service ID without sharing the application ID to the NSP.

A fifth example can include any one or more of the first through fourth examples, wherein the NSC Service ID comprises an NSC unique ID associated with the NSC and a service ID associated with the communication service provided by the NSC.

A sixth example can include any one or more of the first through fifth examples, wherein the communication service comprises online gaming services.

A seventh example can include any one or more of the first through sixth examples, wherein the NSC unique ID identifies the NSC from among different NSCs.

An eighth example can include any one or more of the first through seventh examples, wherein the one or more processors are further configured to receive a downlink (DL) non-access stratum (NAS) transport UE policy container message to receive the rule of the URSP that links the NSC Service ID to the S-NSSAI to enable an association of a packet data unit (PDU) session with the S-NSSAI for the application of the communication service on the NSaaS.

A ninth example can include any one or more of the first through eighth examples, wherein the rule of the URSP associates traffic of the application to the NSC Service ID with the S-NSSAI, and further comprises at least one of: a session and service continuity (SSC) mode, a preferred access type, or a data network name (DNN), for example "internet".

A tenth example can include any one or more of the first through ninth examples, wherein the one or more processors are further configured to release, suspend, or resume the data traffic on the network slice instance only by the NSC Service ID received from the NSC and the S-NSSAI in the traffic descriptor of the URSP received from the NSP, wherein the NSP comprises a network operator that assigns the NSC Service ID to the NSC for the network slice instance.

An eleventh example can include any one or more of the first through tenth examples, wherein the network slice instance is associated with an application service consisting of only online gaming that is indicated in the NSC Service ID received from the NSC.

An twelfth example can include any one or more of the first through eleventh examples, wherein the one or more processors are further configured to repeat a registration or a binding of an application to another NSC Service ID in response to changing a universal mobile telecommunication system (UMTS) subscriber identity module (USIM).

A thirteenth example is a tangible computer readable storage device storing executable instructions that, in response to execution, cause one or more processors of a user equipment (UE) to perform operations, the operations comprising: receiving, from a network slice provider (NSP), a UE route selection policy (URSP) comprising a traffic descriptor that includes a network slice customer (NSC) Service ID; determining an application service derived from the NSC Service ID; determining a single network slice selection assistance information (S-NSSAI) from the URSP; and linking the application service to a network slice based on the NSC Service ID and the S-NSSAI.

A fourteenth example can include the thirteenth example, the operations further comprising: receiving the NSC Service ID from a network slice customer (NSC) that identifies the application service and the NSC providing the application service to the UE with the network slice.

A fifteenth example can include any one or more of the thirteenth through the fourteenth examples, the operations further comprising: in response to detecting initiation of an application of the application service, routing traffic to the network slice based on the NSC Service ID associated with the S-NSSAI without sharing an application identifier of the application with the NSP.

A sixteenth example can include any one or more of the thirteenth through the fifteenth examples, the operations further comprising: determining from the NSC Service ID an NSC unique ID; and determining the application service from a service ID of the NSC Service ID, wherein the NSC Service ID enables an association of the NSC with the application service for the network slice.

A seventeenth example can include any one or more of the thirteenth through the sixteenth examples, the operations further comprising: determining whether the NSC Service ID is associated with an online gaming service based on a service ID of the NSC Service ID; determining whether an application ID associated with the online gaming service matches a URSP rule of the URSP in response to an initiation of the online gaming service; determining whether an existing packet data unit (PDU) session matches a route selection descriptor of a traffic descriptor that comprises the NSC Service ID and the S-NSSAI; in response to a determination that the NSC Service ID is associated with the online gaming service, a match of the application ID with the URSP rule of the URSP, and the existing PDU session matching the route selection descriptor, associating the online gaming service to the existing PDU session on the network slice that is associated with the S-NSSAI.

An eighteenth example can be an apparatus configured to be employed in a user equipment (UE) comprising: one or more processors configured to: receive, from a network slice provider (NSP), a UE route selection policy (URSP) that associates a network slice customer (NSC) Service ID to a traffic descriptor; determine a single network slice selection assistance information (S-NSSAI) from the URSP; and associate an application service to a network slice based on the NSC Service ID and the S-NSSAI to operate an application that includes the application service on the network slice.

A nineteenth example can include the eighteenth example, wherein the one or more processors are further configured to determine the application service derived from an NSC service ID in the NSC Service ID from an NSC entity that obtained management of the network slice from the NSP as a network operator.

A twentieth example can include any one or more of the eighteenth through nineteenth examples, wherein the URSP comprises a URSP rule that associates the NSC Service ID of the NSC with the S-NSSAI.

A twenty-first example can be an apparatus configured to be employed in an access node for network slicing comprising: one or more processors configured to: provide a request to obtain a network slice of a network slice as a service (NSaaS) to provide a communication service on the network slice for an end-user device; determine a network slice customer (NSC) Service identity (ID) associated with the network slice in response to obtaining the network slice; and provide the NSC Service ID for the communication service to be performed on the network slice by the end-user device.

A twenty-second example can include the twenty-first example, wherein the one or more processors are further configured to receive the NSC Service ID from a network slice provider (NSP), a network operator or a core network component to assign the access node as a network slice customer (NSC) for the network slice.

A twenty-third example can include any one of the twenty-first through twenty-second examples, wherein the Network Service ID comprises a unique ID that is independent of a network operator.

A twenty-fourth example can include any one of the twenty-first through twenty-third examples, wherein the one or more processors are further configured to obtain an NSC unique ID within the NSC Service ID from a global entity that comprises at least one of: a global system for mobile communications alliance (GSMA) or 3GPP independent of a network slice provider (NSP), a network operator or a core network component.

A twenty-fifth example can include any one of the twenty-first through twenty-fourth examples, wherein the one or more processors are further configured to enable a user equipment or the end-user device to utilize the network slice based on the NSC Service ID.

A twenty-sixth example can include any one of the twenty-first through twenty-fifth examples, wherein the one or more processors are further configured to associate a single application service as the communication service to the NSC Service ID.

A twenty-seventh example can include any one of the twenty-first through twenty-sixth examples, wherein the one or more processors are further configured to provide the NSC Service ID to the end-user device with an indication of the single application service that enables the end-user device to operate the single application service on the network slice based on the NSC Service ID and a user equipment (UE) route selection policy (URSP) that comprises a traffic descriptor comprising the NSC Service ID and a rule that associates the NSC Service ID with a single network slice selection assistance information (S-NSSAI).

A twenty-eighth example can include any one of the twenty-first through twenty-seventh examples, wherein the one or more processors are further configured to provide the NSC Service ID comprising a service ID and an NSC unique ID.

A twenty-ninth example can include any one of the twenty-first through twenty-eighth examples, wherein the service ID indicates an application service as the communication service to be used on the network slice, wherein the application service comprises at least one of: a data streaming service, an online gaming service, or an augmented reality service.

A thirtieth example can include any one of the twenty-first through twenty-ninth examples, wherein the one or more processors are communicatively coupled to a network slice provider (NSP), a network operator or a core network component configured to indicate a rule in a UE route selection policy (URSP) that indicates the NSC Service ID is associated with the network slice based on an S-NSSAI and enable an association of a packet data unit (PDU) session with the S-NSSAI for an application service of the communication service on the network slice.

A thirty-first example can include any one of the twenty-first through thirtieth examples wherein the URSP comprise a traffic descriptor that includes the NSC Service ID.

A thirty-second example can be an apparatus configured to be employed in an access node for a network slice as a service (NSaaS) network comprising: one or more processors configured to: communicatively couple to a network slice customer (NSC); receive a request from the NSC to obtain or reserve a network slice of the NSaaS; assign a network slice to the NSC in response to the request by the NSC; and provide a user equipment (UE) route selection policy (URSP) comprising a traffic descriptor that includes an NSC Service ID.

A thirty-third example can include the thirtieth example, wherein the one or more processors are further configured to generate a URSP rule of the URSP that associates traffic of an application to the NSC Service ID with an S-NSSAI, and further comprises at least one of: a session and service continuity (SSC) mode, a preferred access type, or a data network name (DNN), for example "internet".

A thirty-fourth example can include any one of the thirtieth through thirty-third examples, wherein the NSC Service ID comprises an NSC unique ID associated with the NSC and a service ID associated with a communication service to be provided by the NSC on the network slice.

A thirty-fifth example can include any one of the thirtieth through thirty-fourth examples, wherein the one or more processors are further configured to provide a downlink (DL) non-access stratum (NAS) transport UE policy container message with a rule of the URSP that links the NSC Service ID to the S-NSSAI to enable an association of a packet data unit (PDU) session with the S-NSSAI for an application of a communication service on the network slice.

A thirty-sixth example can include any one of the thirtieth through thirty-sixth examples, wherein the one or more processors are further configured to provide an NSC Unique ID to the NSC to distinguish the NSC among other NSCs providing a communication service and provide a Service ID for the NSC to associate the communication service on the network slice.

A thirty-seventh example can be a tangible computer readable storage device storing executable instructions that, in response to execution, cause one or more processors of an Access Node (AN) to perform operations, the operations comprising: determining a network slice customer (NSC) Service identity (ID) associated with a network slice; and providing the NSC Service ID for a communication service to be performed on the network slice by a user equipment (UE).

A thirty-eighth example can include the thirty-seventh example, the operations further comprising: provide the NSC Service ID to the UE with an indication of the single application service that enables the UE to operate the single application service on the network slice based on the NSC Service ID and a UE route selection policy (URSP) that comprises a traffic descriptor comprising the NSC Service ID and a rule that associates the NSC Service ID with a single network slice selection assistance information (5-NSSAI).

A thirty-ninth example can include any one of the thirty-seventh through thirty-eighth examples, the operations further comprising: enabling the UE to perform the communication service for an application on the network slice based on the NSC Service ID and an S-NSSAI without providing an application ID or without communicating a request to obtain the network slice for the application.

A fortieth example can include any one of the thirty-seventh through thirty-ninth examples, the operations further comprising: associating a Service ID of the NSC Service ID to a particular communication service for an application of the UE that utilizes the communication service and an NSC Unique ID of the NSC service ID with an NSC that obtained the network slice.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in an Access Node (AN) for network slicing comprising: one or more processors configured to:
provide a request to obtain a network slice of a network slice as a service (NSaaS) to provide a communication service on the network slice for an end-user device;
determine a network slice customer (NSC) Service identity (ID) associated with the network slice in response to obtaining the network slice; and
provide the NSC Service ID for the communication service to be performed on the network slice by the end-user device.

2. The apparatus of claim 1, wherein the one or more processors are further configured to receive the NSC Service ID from a network slice provider (NSP), a network operator or a core network component to assign the access node as a network slice customer (NSC) for the network slice.

3. The apparatus of claim 1, wherein the NSC Service ID comprises a unique ID that is independent of a network operator.

4. The apparatus of claim 1, wherein the one or more processors are further configured to obtain an NSC unique ID within the NSC Service ID from a global entity that comprises at least one of: a global system for mobile communications alliance (GSMA) or 3GPP independent of a network slice provider (NSP), a network operator or a core network component.

5. The apparatus of claim 1, wherein the one or more processors are further configured to enable a user equipment or the end-user device to utilize the network slice based on the NSC Service ID.

6. The apparatus of claim 1, wherein the one or more processors are further configured to associate a single application service as the communication service to the NSC Service ID.

7. The apparatus of claim 6, wherein the one or more processors are further configured to provide the NSC Service ID to the end-user device with an indication of the single application service that enables the end-user device to operate the single application service on the network slice based on the NSC Service ID and a user equipment (UE) route selection policy (URSP) that comprises a traffic descriptor comprising the NSC Service ID and a rule that associates the NSC Service ID with a single network slice selection assistance information (S-NSSAI).

8. The apparatus of claim 1, wherein the one or more processors are further configured to provide the NSC Service ID comprising a service ID and an NSC unique ID.

9. The apparatus of claim 8, wherein the service ID indicates an application service as the communication service to be used on the network slice, wherein the application service comprises at least one of: a data streaming service, an online gaming service, or an augmented reality service.

10. The apparatus of claim 1, wherein the one or more processors are communicatively coupled to a network slice provider (NSP), a network operator or a core network component configured to indicate a rule in a UE route selection policy (URSP) that indicates the NSC Service ID is associated with the network slice based on an S-NSSAI and enable an association of a packet data unit (PDU) session with the S-NSSAI for an application service of the communication service on the network slice.

11. The apparatus of claim 10, wherein the URSP comprise a traffic descriptor that includes the NSC Service ID.

12. An apparatus configured to be employed in an Access Node (AN) for a network slice as a service (NSaaS) network comprising:

one or more processors configured to:
- communicatively couple to a network slice customer (NSC);
- receive a request from the NSC to obtain or reserve a network slice of the NSaaS;
- assign a network slice to the NSC in response to the request by the NSC; and
- provide a user equipment (UE) route selection policy (URSP) comprising a traffic descriptor that includes an NSC Service ID.

13. The apparatus of claim 12, wherein the one or more processors are further configured to generate a URSP rule of the URSP that associates traffic of an application to the NSC Service ID with a single network slice selection assistance information (S-NSSAI), and further comprises at least one of: a session and service continuity (SSC) mode, a preferred access type, or a data network name (DNN).

14. The apparatus of claim 12, wherein the NSC Service ID comprises an NSC unique ID associated with the NSC and a service ID associated with a communication service to be provided by the NSC on the network slice.

15. The apparatus of claim 12, wherein the one or more processors are further configured to provide a downlink (DL) non-access stratum (NAS) transport UE policy container message with a rule of the URSP that links the NSC Service ID to a S-NSSAI to enable an association of a packet data unit (PDU) session with the S-NSSAI for an application of a communication service on the network slice.

16. The apparatus of claim 12, wherein the one or more processors are further configured to provide an NSC Unique ID to the NSC to distinguish the NSC among other NSCs providing a communication service and provide a Service ID for the NSC to associate the communication service on the network slice.

17. A method of an Access Node (AN) to perform operations via processing circuitry, comprising:
- determining a network slice customer (NSC) Service identity (ID) associated with a network slice; and
- providing the NSC Service ID for a communication service to be performed on the network slice by a user equipment (UE).

18. The method of claim 17, further comprising:
providing the NSC Service ID to the UE with an indication of a single application service that enables the UE to operate the single application service on the network slice based on the NSC Service ID and a UE route selection policy (URSP) that comprises a traffic descriptor comprising the NSC Service ID and a rule that associates the NSC Service ID with a single network slice selection assistance information (S-NSSAI).

19. The method of claim 17, further comprising:
enabling the UE to perform the communication service for an application on the network slice based on the NSC Service ID and an S-NSSAI without providing an application ID or without communicating a request to obtain the network slice for the application.

20. The method of claim 17, further comprising:
associating a service ID of the NSC Service ID to a particular communication service for an application of the UE that utilizes the communication service and an NSC Unique ID of the NSC service ID with an NSC that obtained the network slice.

* * * * *